United States Patent [19]
Cioffi et al.

[11] Patent Number: 5,024,806
[45] Date of Patent: Jun. 18, 1991

[54] ENHANCED DEBRIS FILTER BOTTOM NOZZLE FOR A NUCLEAR FUEL ASSEMBLY

[75] Inventors: Joseph V. Cioffi; John S. Kerrey, both of Columbia, S.C.

[73] Assignee: Westinghouse Electric Corp., Pittsburgh, Pa.

[21] Appl. No.: 410,574

[22] Filed: Sep. 21, 1989

[51] Int. Cl.⁵ .................. G21C 3/04; G21C 15/00; G21C 19/00
[52] U.S. Cl. .................. 376/352; 376/313; 376/443; 138/37; 138/40
[58] Field of Search ............. 376/352, 313, 440, 441, 376/442, 439, 443; 138/37, 40

[56] References Cited

U.S. PATENT DOCUMENTS

| | | | |
|---|---|---|---|
| 1,240,081 | 9/1917 | Moss | 210/521 |
| 1,448,151 | 3/1923 | Reeves | 138/40 |
| 2,688,985 | 9/1954 | Holdenried | 138/37 |
| 2,825,203 | 3/1958 | Bertin et al. | 138/40 |
| 3,070,534 | 12/1962 | Kooistra | 204/193.2 |
| 3,133,867 | 5/1964 | Frisch | 176/78 |
| 3,182,003 | 5/1965 | Thorp et al. | 176/78 |
| 3,379,618 | 4/1968 | Frisch | 376/440 |
| 3,380,890 | 4/1968 | Glandin et al. | 176/78 |
| 3,510,397 | 5/1970 | Zettervall | 176/78 |
| 3,775,249 | 11/1973 | Clapham | 376/440 |
| 3,801,453 | 4/1974 | Jones | 176/78 |
| 3,840,051 | 10/1974 | Akashi et al. | 138/40 |
| 4,036,692 | 7/1977 | Walton | 376/440 |
| 4,038,137 | 7/1977 | Pugh | 176/78 |
| 4,076,586 | 2/1978 | Bideau et al. | 376/352 |
| 4,152,206 | 5/1979 | Jabsen | 376/440 |
| 4,172,761 | 10/1979 | Raven et al. | 376/442 |
| 4,427,624 | 1/1984 | Marlatt et al. | 376/352 |
| 4,508,679 | 4/1985 | Matzner et al. | 376/441 |
| 4,675,154 | 1/1987 | Nelson et al. | 376/439 |
| 4,684,495 | 8/1987 | Wilson et al. | 376/352 |
| 4,684,496 | 8/1987 | Wilson et al. | 376/352 |
| 4,772,447 | 9/1988 | Manson et al. | 376/442 |
| 4,781,884 | 11/1988 | Anthony | 376/352 |
| 4,828,791 | 5/1989 | DeMario | 376/352 |
| 4,832,905 | 5/1989 | Bryan et al. | 376/352 |
| 4,849,161 | 7/1989 | Brown et al. | 376/440 |

FOREIGN PATENT DOCUMENTS

| | | | |
|---|---|---|---|
| 0213813 | 3/1987 | European Pat. Off. . | |
| 0289829 | 11/1988 | European Pat. Off. | 376/352 |
| 3832910 | 4/1989 | Fed. Rep. of Germany . | |
| 2531258 | 5/1984 | France . | |
| 0141989 | 5/1979 | Japan | 376/352 |
| 1251787 | 11/1986 | Japan | 376/440 |
| 2096891 | 5/1987 | Japan | 376/352 |
| 1153444 | 5/1969 | United Kingdom . | |

Primary Examiner—Harvey E. Behrend

[57] ABSTRACT

A debris filter bottom nozzle of a nuclear fuel assembly is spaced below the lowermost grid, supports the guide thimbles, and is adapted to allow flow of liquid coolant into the fuel assembly. The debris filter bottom nozzle includes an enclosure defining a coolant flow chamber therethrough, and an upper transverse nozzle structure composed of a consolidated array of elongated cylindrical sections disposed across the chamber of the enclosure in side-by-side relation to one another, extending axially in the direction of coolant flow through the chamber, rigidly connected together and to the enclosure, and having tubular cross-sectional configurations defining passages for the coolant flow through the chamber.

10 Claims, 3 Drawing Sheets

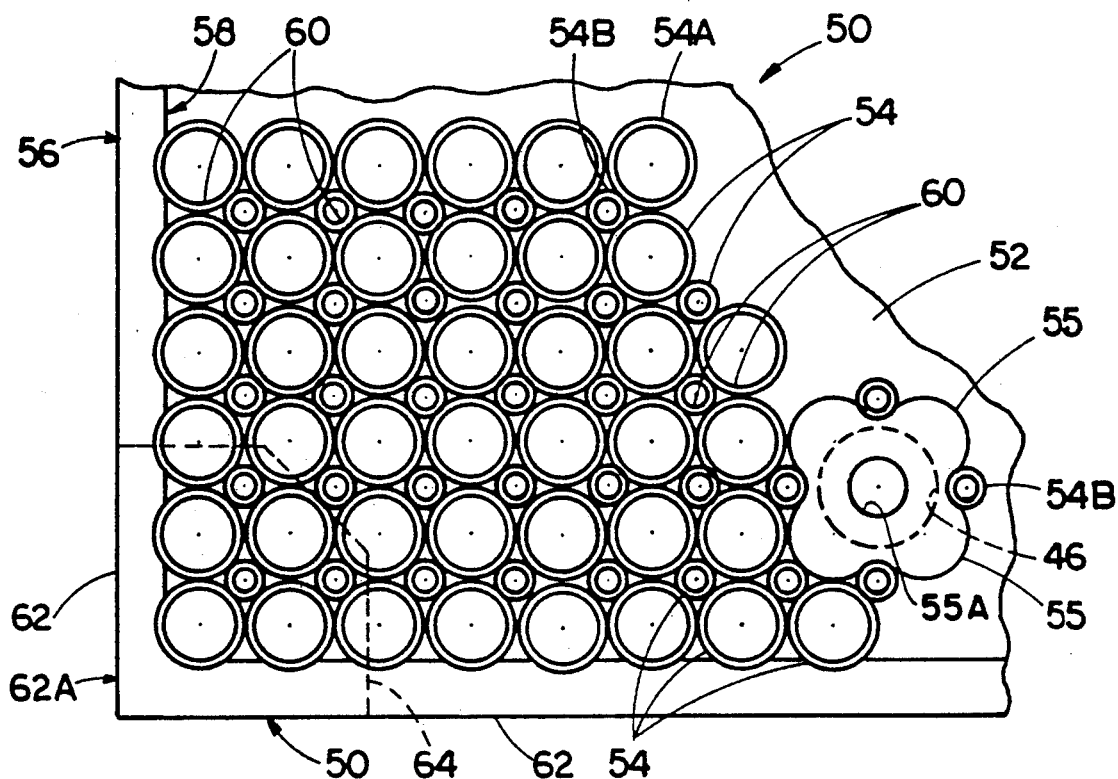
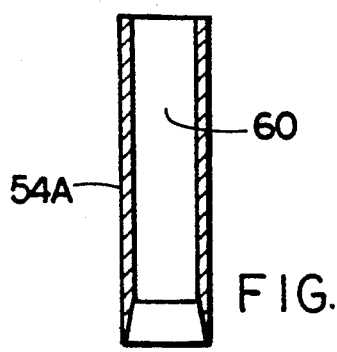
FIG. 5
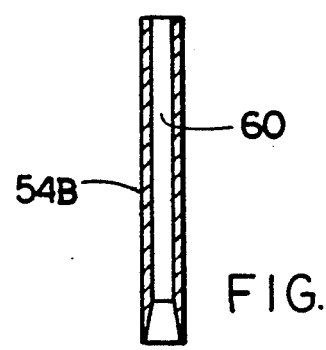
FIG. 6
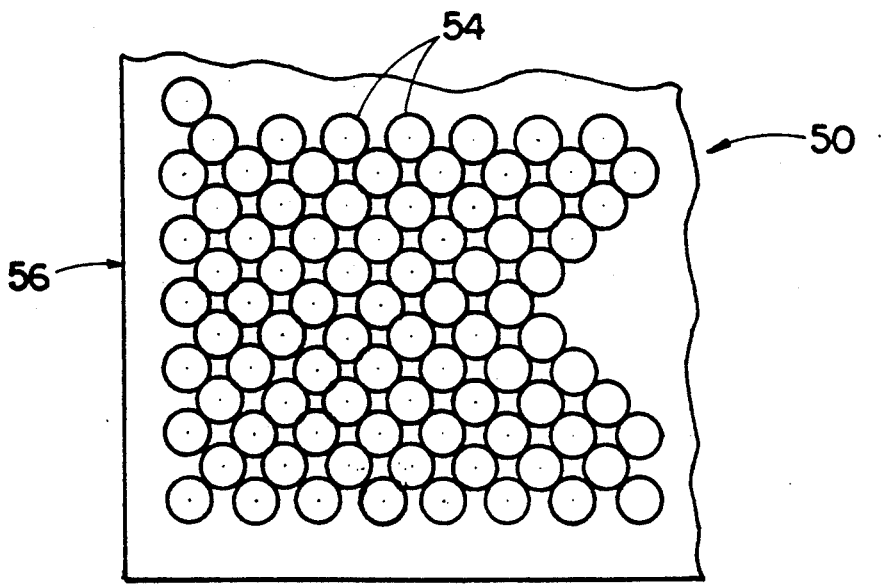
FIG. 7

ENHANCED DEBRIS FILTER BOTTOM NOZZLE FOR A NUCLEAR FUEL ASSEMBLY

CROSS REFERENCE TO RELATED APPLICATIONS

Reference is hereby made to the following copending patent applications dealing with related subject matter and assigned to the assignee of the present invention:

1. "Debris Trap For A Pressurized Water Nuclear Reactor" by John F. Wilson et al, assigned U.S. Ser. No. 672,040 and filed Nov. 16, 1984.
2. "Fuel Assembly Bottom Nozzle With Integral Debris Trap" by John F. Wilson et al, assigned U.S. Ser. No. 672,041 and filed Nov. 16, 1984.
3. "Wire Mesh Debris Trap For A Fuel Assembly" by William Bryan, assigned U.S. Ser. No. 679,511 and filed Dec. 7, 1984.
4. "Debris-Retaining Trap For A Fuel Assembly" by John A. Rylatt, assigned U.S. Ser. No. 720,109 and filed Apr. 4, 1985.
5. "Bottom Grid Mounted Debris Trap For A Fuel Assembly" by Harry M. Ferrari et al, assigned U.S. Ser. No. 763,737 and filed Aug. 8, 1985.
6. "Nuclear Fuel Assembly Debris Filter Bottom Nozzle" by John M. Shallenberger et al, assigned U.S. Ser. No. 211,150 and filed June 22, 1988, a continuation of U.S. Ser. No. 046,219, filed May 5, 1987, and now abandoned.
7. "Nuclear Fuel Assembly Debris Resistant Bottom Nozzle" by Edmund E. DeMario, assigned U.S. Ser. No. 104,748 and filed Oct. 5, 1987.

BACKGROUND OF THE INVENTION

1. Field of the Invention

The present invention relates generally to nuclear reactors and, more particularly, is concerned with an enhanced debris filter bottom nozzle for a nuclear fuel assembly.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems. Most of the debris consists of metal turnings which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg-crate" shaped cell walls of the grid and the lower end portions of the fuel rod tubes. The damage consists of fuel rod tube perforations caused by fretting of debris in contact with the exterior of the tube. Debris also becomes entangled in the nozzle plate holes and the flowing coolant causes the debris to gyrate which tends to cut through the cladding of the fuel rods.

Several different approaches have been proposed and tried for carrying out removal of debris from nuclear reactors. Many of these approaches are discussed in U.S. Pat. No. 4,096,032 to Mayers et al. Others are illustrated and described in the U.S. patent applications cross-referenced above. While all of the approaches described in the cited patent and patent applications operate reasonably well and generally achieve their objectives under the range of operating conditions for which they were designed, a need still exists for a fresh approach to the problem of debris filtering in nuclear reactors. The new approach must be compatible with the existing structure and operation of the components of the reactor, and at least provide overall benefits which outweigh the costs it adds to the reactor.

SUMMARY OF THE INVENTION

The present invention provides an enhanced debris filter bottom nozzle in a fuel assembly designed to satisfy the aforementioned needs. The bottom nozzle of the present invention has increased strength and provides for finer filtration by incorporating a consolidated joined array of tubular and solid right cylindrical sections in place of a flat plate full of holes. A major drawback to increased filtration and strength of a plate-type debris filter is the practical limit on reducing flow hole diameter and spacing, while increasing plate thickness and thus hole depth. The enhanced debris filter bottom nozzle of the present invention overcomes these limits by replacing the flat plate and its holes with an array of tubes and bars of appropriate inside and outside diameters, length, and pattern, enclosed and joined to form the debris filter bottom nozzle.

Accordingly, the present invention is directed to a debris filter bottom nozzle useful in a fuel assembly for a nuclear reactor wherein the fuel assembly includes a plurality of nuclear fuel rods, at least one grid supporting the fuel rods in an organized array, and at least one guide thimble supporting the grid. The debris filter bottom nozzle is spaced below the grid, supports the guide thimble, and is adapted to allow flow of liquid coolant into the fuel assembly. The debris filter bottom nozzle comprises: (a) an enclosure defining a coolant flow chamber therethrough; and (b) a consolidated array of elongated cylindrical sections disposed across the chamber of the enclosure in side-by-side relation to one another, extending axially in the direction of coolant flow through the chamber, and rigidly connected together and to the enclosure. At least some of the cylindrical sections have tubular cross-sectional configurations defining passages for the coolant flow through the chamber. Some other of the cylindrical sections are solid in cross-sectional configuration. The diameters of the tubular cylindrical sections are substantially equal or, alternatively, are of at least two different sizes. The cylindrical sections are shorter in axial length than the height of the enclosure.

The enclosure of the bottom nozzle includes a plurality of interconnected upstanding side walls which define the coolant flow chamber therethrough. The enclosure also includes a plurality of legs connected to the side walls for supporting the bottom nozzle in the reactor. Further, the interconnected side walls define a plurality of corners in the enclosure and each of the support legs is disposed at one of the corners of the enclosure.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is a fragmentary top plan view of a debris filter bottom nozzle of the present invention, illustrating tubes of different diameter sizes composing the upper transverse nozzle structure.

FIG. 5 is a longitudinal sectional view of one of the larger diameter tubes in the debris filter bottom nozzle of FIG. 4.

FIG. 6 is a longitudinal sectional view of one of the smaller diameter tubes in the debris filter bottom nozzle of FIG. 4.

FIG. 7 is a schematic top plan view of an alternative debris filter bottom nozzle of the present invention, illustrating tubes of the same diameter size composing the upper transverse nozzle structure.

DETAILED DESCRIPTION OF THE INVENTION

Figure 1:
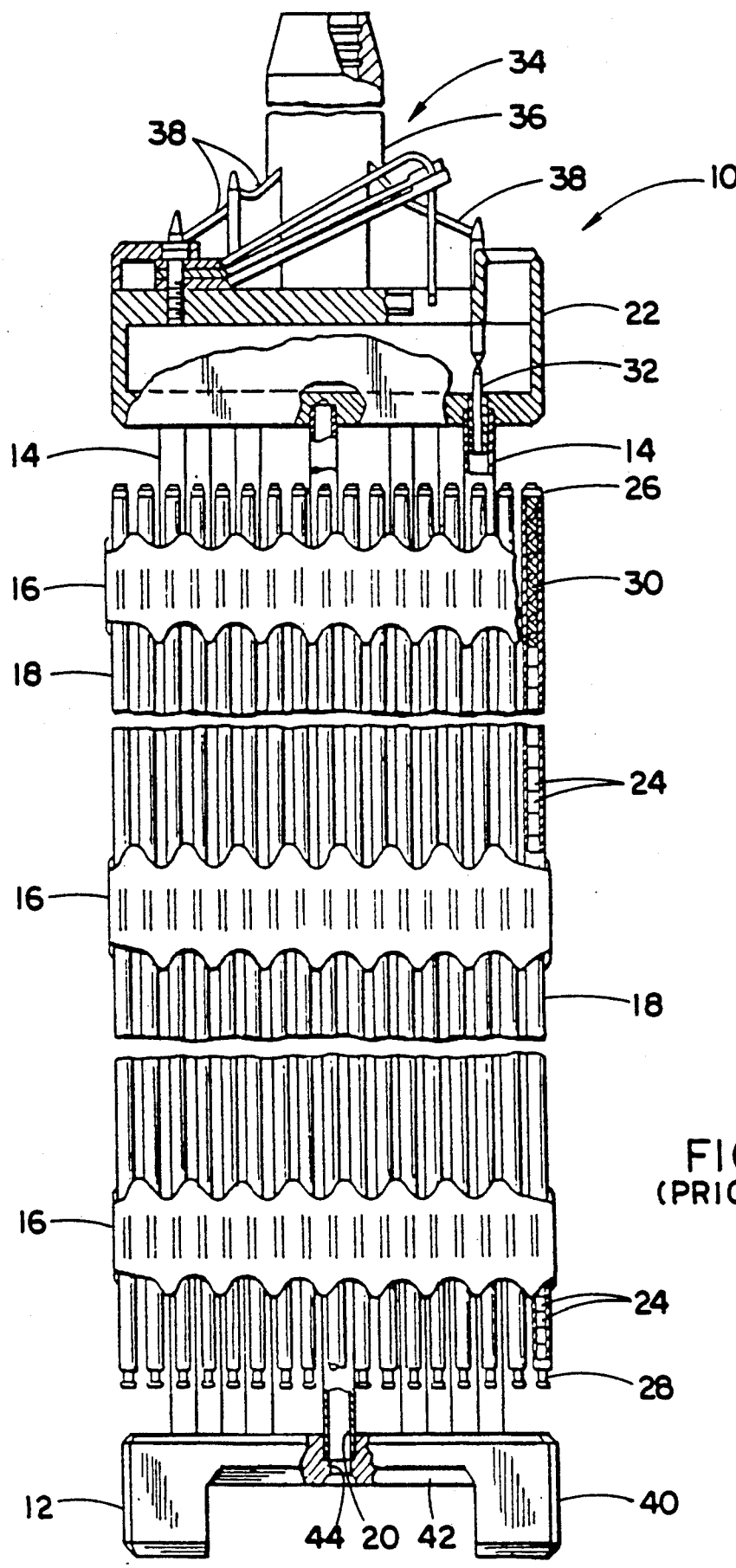
FIG. 1 is an elevational view, partly in section, of a prior art fuel assembly to which the enhanced debris filter bottom nozzle of the present invention can be applied, the assembly being illustrated in vertically foreshortened form with parts broken away for clarity.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a conventional nuclear reactor fuel assembly, represented in vertically foreshortened form and generally designated by the numeral 10. Being the type use in a pressurized water nuclear reactor (PWR), the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes a plurality of nuclear fuel pellets 24 and is closed at its opposite ends closed by upper and lower end plugs 26, 28 so as to hermetically seal the rod. Commonly, a plenum spring 30 is within the fuel rod 18 between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, a rod cluster control mechanism 34 positioned above the top nozzle 22 supports the control rods 32. The control mechanism has an internally threaded cylindrical member 36 with a plurality of radially extending flukes or arms 38. Each arm 38 is interconnected to a control rod 32 such that the control mechanism 34 is operable to move the control rods vertically in the guide thimbles 14 to thereby control the fission process in the fuel assembly 10, all in a well-known manner.

Prior Art Bottom Nozzle

Figure 2:
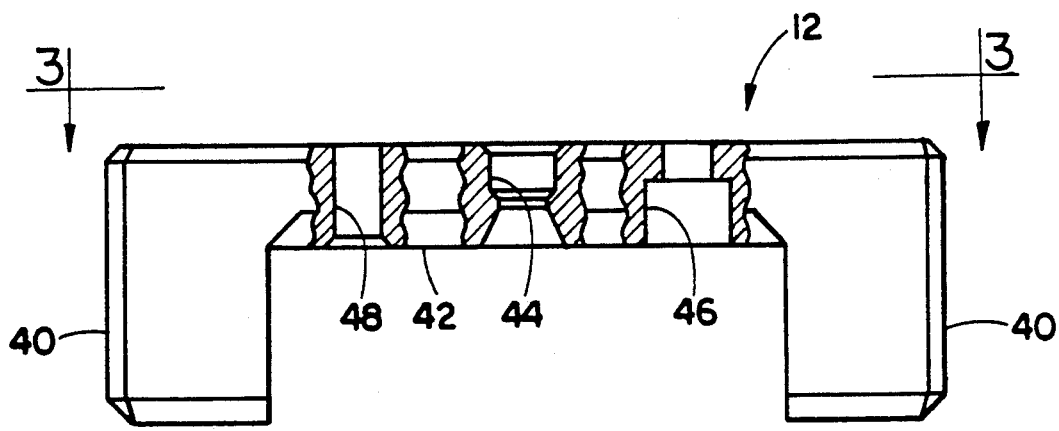
FIG. 2 is an enlarged elevational view, partly broken away and in section, of the prior art bottom nozzle of the fuel assembly of FIG. 1.
Figure 3:
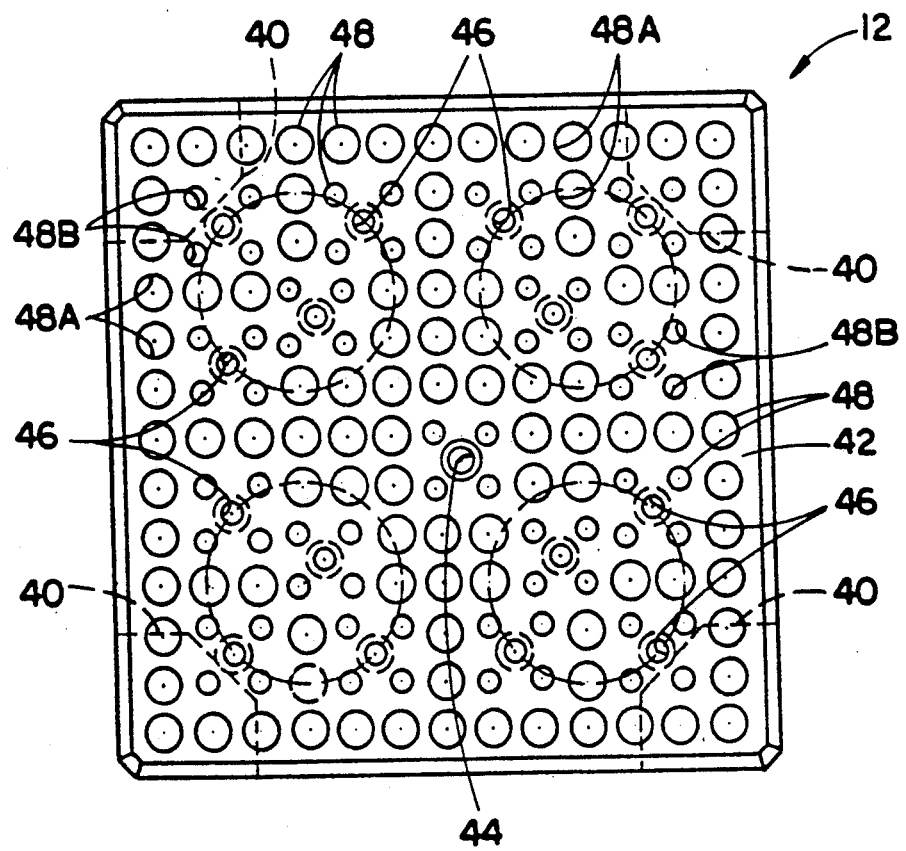
FIG. 3 is a top plan view of the prior art bottom nozzle as seen along line 3—3 of FIG. 2, illustrating the pattern of flow holes formed in its adapter plate.

Referring to FIGS. 2 and 3, there is illustrated the bottom nozzle 12 of the prior art fuel assembly 10. In addition to supporting the fuel assembly 10 on the lower core support plate (not shown), the bottom nozzle 12 also permits passage of coolant flow upwardly from the lower core plate inlets (not shown) into the fuel assembly 10. The bottom nozzle 12 includes support means in the form of a plurality of corner legs 40 for supporting the fuel assembly 10 on the lower core plate and an upper generally rectangular planar adapter plate 42 suitably attached, such as by welding, to the corner legs 40.

The upper adapter plate 42 of the bottom nozzle 12 is connected to the lower ends of the instrumentation tube 20 and guide thimbles 14 through their receipt respectively in a central hole 44 and a plurality of outer spaced holes 46 formed through the adapter plate 42. The guide thimble holes 46 are spaced radially and circumferentially with relation to the location of the central hole 44. A plurality of coolant flow holes 48 are also formed through the upper adapter plate 42 of the bottom nozzle 12, being spaced between and about the holes 44, 46 for the instrumentation tube 20 and guide thimbles 14. There are a relatively large number of these flow holes 48, typically, in two different diameter sizes, for instance 0.50 and 0.25 inch. The flow holes 48A, 48B (FIG. 3) are large enough in their respective diameters to pass the damaging-size debris typically carried in the coolant flow.

Prior Art Debris Filter Bottom Nozzle

As mentioned above, fuel assembly damage due to debris trapped at or below the lowermost one of the transverse grids 16 has been found to be a problem. Therefore, to prevent occurrence of such damage, it is highly desirable to prevent this debris from passing through the flow holes 48 of the prior art bottom nozzle 12. In the sixth patent application cross-referenced above, the disclosure of which is incorporated herein by reference, the relatively large flow holes 48A, 48B of the above-described prior art bottom nozzle 12 have been replaced with an increased number of smaller holes which are sized to "filter out" damaging-size debris without adversely affecting flow or pressure drop through the adapter plate 42 and across the fuel assembly 10. The debris filter bottom nozzle of the sixth cross-referenced application is different from the prior art bottom nozzle 12 in regard to the number, density and size of the debris-filtering coolant flow holes in the adapter plate thereof and the size of the inlet chamfers at each debris-filtering flow hole. Further, these smaller debris-filtering flow holes are preferably uniform in cross-sectional size and defined in a pattern which substantially covers every portion of the plate across its length and breadth. The diameter of the debris-filtering flow holes are preferably about 0.190 inch which prevents passage of debris that is of the size typically caught in the lowermost grid 16.

The debris filter bottom nozzle of the sixth cross-referenced application with the more dense, smaller size debris-filtering coolant flow holes drilled in its adapter plate has proven to be highly successful. However, in certain instances, it has been found desirable to provide a debris filter bottom nozzle with even more and smaller debris-filtering coolant flow holes in order to obtain a higher degree of filtering. But attempting to machine, i.e., drill, more and smaller holes would be difficult and costly because: (1) with smaller ligaments (the metal material of the adapter plate between the holes), the drill would have a tendency to wander from its desired position; and (2) it would take more time to drill more holes. Furthermore, some adapter platers are considerably thicker than the one shown in FIG. 2, and thus, drilling of even the same diameter size holes through such thicker adapter plates would be even more time consuming and costly.

Enhanced Debris Filter Bottom Nozzle

Referring to FIGS. 4-6, there is illustrated the enhanced debris filter bottom nozzle of the present invention, generally indicated 50. The enhanced debris filter bottom nozzle 50 has increased strength and provides for finer filtration by incorporating an upper transverse structure 52 composed of a consolidated joined array of right cylindrical sections 54 in place of a flat plate full of holes, as provided in the above-described bottom nozzle of the cross-referenced application. A major drawback to increased filtration and strength of a plate-type debris filter is the practical limit on reducing flow hole diameter and spacing, while increasing plate thickness and thus hole depth. The enhanced debris filter bottom nozzle 50 of the present invention overcomes these limits by replacing the plate and its holes with an array of elongated cylindrical sections 54 consolidated and joined together to define the upper transverse structure 52 of the debris filter bottom nozzle.

Therefore, in its basic components, the debris filter bottom nozzle 50 of the present invention includes an enclosure 56 defining a coolant flow chamber 58 therethrough, and the consolidated array of elongated cylindrical sections 54 disposed across the chamber 58 of the enclosure 56. The cylindrical sections 54 are disposed in side-by-side relation to one another and are rigidly connected together and to the enclosure 56. The cylindrical sections 54 also extend axially in the direction of coolant flow through the chamber 58.

More particularly, at least some, and preferably most, of the cylindrical sections 54A, 54B (FIGS. 5 and 6) have stainless steel thin-walled tubes arranged in a rectangular or square configuration. The sections 54A, 54B thus have tubular cross-sectional configurations defining passages 60 therethrough for the coolant flow through the chamber 58. The ends of the tubular sections 54A, 54B are chamfered to attain good hydraulic characteristics. The diameters of each tubular section 54 may vary, depending on what sizes are needed to fill in the dimensions of the bottom nozzle 50. A few of the cylindrical sections are solid in cross-sectional configuration. For example, a group of four solid sections 55 (FIG. 4) are rigidly connected together and drilled to define a bore 55A for receiving and attaching to the bottom end of one guide thimble 14. As seen in FIGS. 4-6, the tubular sections 54 have diameters of two different sizes, being shown as tubular section 54A in FIG. 5 and as tubular section 54B in FIG. 6. Alternatively, in FIG. 7, the tubular sections 54 are all of the same diameter size.

The enclosure 56 of the enhanced debris filter bottom nozzle 50 is composed of a plurality of interconnected upstanding side walls 62 which define the coolant flow chamber 58 therethrough. The upper transverse structure 52 composed of the cylindrical sections 54 are shorter in axial length than the height of the enclosure 56 and substantially equal to the thickness of the top adapter plate of the prior art debris filter bottom nozzle of FIG. 2. The enclosure 56 also includes a plurality of legs 64 connected to the side walls 62 for supporting the bottom nozzle 50 in the reactor. The interconnected side walls 62 define a plurality of corners 62A in the enclosure 56 and each of the support legs 64 is disposed at one of the corners 62A of the enclosure 56.

The cylindrical sections 54, fixture frame or enclosure 56 and legs 64 are made of stainless steel and are all braised together simultaneously. Once the desired tube arrangement has been attained, the bottom nozzle 50 is placed in a furnace where the braising alloy around the sections 54 and the various locations in the enclosure 56 melts to bind everything together.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely an exemplary embodiment thereof.

We claim:

1. In a fuel assembly for a nuclear reactor including a plurality of nuclear fuel rods, at last one grid supporting said fuel rods in an organized array, and at least one guide thimble supporting said grid, a debris filter bottom nozzle spaced below said grid and said fuel rods, supporting said guide thimble and adapted to allow flow of liquid coolant into said fuel assembly, said debris filter bottom nozzle comprising:

(a) an enclosure defining a chamber having opposite open ends for coolant flow therethrough in an axial direction from one of said ends to the other of said ends; and (b) an array of elongated hollow tubes disposed across said chamber of said enclosure in a consolidated side-by-side relation to one another and in abutting contact with one another and rigidly interconnected to said enclosure and to one another to form a unitary structure, said hollow tubes extending substantially parallel to one another and axially in the direction of coolant flow through said chamber;

(c) said array of elongated hollow tubes including a first plurality of tubes of a substantially constant first diameter size and a second plurality of tubes of a substantially constant second diameter size which is smaller than the first diameter size of said first plurality of tubes, said first plurality of tubes being interspersed with said second plurality of tubes in an ordered pattern, said first and second pluralities of elongated hollow tubes being substantially arranged in interconnected structural units wherein each unit includes one tube of said second plurality of tubes in abutting contact with at lest three tubes of said first plurality of tubes, said at least three tubes of said first plurality of tubes being circumferentially arranged around said one tube of said second plurality of tubes and in abutting contact with one another, said first and second pluralities of hollow tubes having hollow tubular cross-sectional configurations defining passages for coolant flow through said chamber, said first diameter size tubes of said first plurality of tubes having passages being of a size smaller than a substantial amount of damage-inducing debris contained in the coolant flow which thereby prevents travel of such debris with the coolant flow through the passages.

2. The bottom nozzle as recited in claim 1, wherein at least one of said hollow tubes has a bore for receiving a lower end of said one guide thimble for attachment to said bottom nozzle.

3. The bottom nozzle as recited in claim 1, wherein said hollow tubes are shorter in axial length than the height of said enclosure.

4. The bottom nozzle as recited in claim 1, wherein said enclosure includes a plurality of interconnected upstanding side walls which define said coolant flow chamber therethrough.

5. The bottom nozzle as recited in claim 4, wherein said enclosure also includes a plurality of legs connected to said side walls for supporting said bottom nozzle in the reactor.

6. The bottom nozzle as recited in claim 5, wherein said interconnected side walls define a plurality of corners in said enclosure and each of said support legs is disposed at one of said corners of said enclosure.

7. In a liquid cooled nuclear reactor having a plurality of fuel assemblies, each fuel assembly including a plurality of nuclear fuel rods, a plurality of grids axially disposed along and supporting said fuel rods in an organized array, and a plurality of guide thimbles supporting said grid, a debris filter bottom nozzle spaced below a lowermost one of said girds and said fuel rods, supporting said guide thimbles and adapted to allow flow of liquid coolant into said fuel assembly, said debris filter bottom nozzle comprising:

(a) an enclosure defining a chamber having opposite open ends for coolant flow therethrough in an axial direction from one of said ends to the other said ends; and (b) an upper transverse nozzle structure composed of an array of elongated hollow tubes disposed across said chamber of said enclosure in a consolidated side-by-side relation to one another and in abutting contact with one another and rigidly interconnected to said enclosure, said hollow tubes extending substantially parallel to one another and axially in the direction of coolant flow through said chamber, said hollow tubes being shorter in axial length than the height of said enclosure;

(c) said array of elongated hollow tubes including a first plurality of tubes, a second plurality of tubes and a third plurality of tubes, said first plurality of tubes having a substantially constant first diameter size and said second plurality of tubes having a substantially constant second diameter size which is smaller than the first diameter size of said first plurality of tubes, said first plurality of tubes being interspersed with said second plurality of tubes in an ordered pattern, said first and second pluralities of elongated hollow tubes being substantially arranged in interconnected structural units wherein each unit includes one tube of said second plurality of tubes in abutting contact with at least three tubes of said first plurality of tubes, said at least three tubes of said first plurality of tubes being circumferentially arranged around said one tube of said second plurality of tubes and in abutting contact with one another, said first and second pluralities of hollow tubes having hollow tubular cross-sectional configurations defining passages for coolant flow through said chamber, said first diameter size tubes of said first plurality of tubes having passages being of a size smaller than a substantial amount of damage-inducing debris contained in the coolant flow which thereby prevents travel of such debris with the coolant flow through the passages, said third plurality of hollow tubes having tubular cross-sectional configurations defining bores for receiving lower ends of said guide thimbles for attachment to said bottom nozzle.

8. The bottom nozzle as recited in claim 7, wherein said enclosure includes a plurality of interconnected upstanding side walls which define said coolant flow chamber therethrough.

9. The bottom nozzle as recited in claim 8, wherein said enclosure also includes a plurality of legs connected to said side walls for supporting said bottom nozzle in the reactor.

10. The bottom nozzle as recited in claim 9, wherein said interconnected side walls define a plurality of corners in said enclosure and each of said support legs is disposed at one of said corners of said enclosure.

* * * * *